United States Patent

Campbell

[11] Patent Number: 6,086,311
[45] Date of Patent: Jul. 11, 2000

[54] HANDTRUCK WITH DEFLECTABLE MANDREL FOR LOCKING INSIDE THE CORE OF A REEL OR SPOOL TO BE LIFTED AND MOVED

[76] Inventor: John Campbell, 23 Chalmers Road, Ayr, Ayrshire, Scotland, United Kingdom

[21] Appl. No.: 09/125,876
[22] PCT Filed: Feb. 27, 1997
[86] PCT No.: PCT/GB97/00552
§ 371 Date: Aug. 26, 1998
§ 102(e) Date: Aug. 26, 1998
[87] PCT Pub. No.: WO97/31811
PCT Pub. Date: Sep. 4, 1997

[30] Foreign Application Priority Data

Feb. 27, 1996 [GB] United Kingdom ............ 9604080
Aug. 9, 1996 [GB] United Kingdom ............ 9616764

[51] Int. Cl.[7] .................... B62B 1/14; B65H 19/12; B65H 19/30
[52] U.S. Cl. .................... 414/445; 414/490; 414/911; 242/571.4; 242/588; 242/597.6
[58] Field of Search .................... 414/444, 445, 414/490, 908, 910, 911; 242/403.1, 571.4, 571.5, 588, 597.6, 571.3, 575.4, 586.4, 588.2, 597, 597.1, 597.3

[56] References Cited

U.S. PATENT DOCUMENTS

| | | | |
|---|---|---|---|
| 1,179,035 | 4/1916 | Prouty | 242/571.5 X |
| 2,574,825 | 11/1951 | Guild | 414/445 X |
| 2,706,658 | 4/1955 | Jewell | 414/910 X |
| 2,841,301 | 7/1958 | Sherriff | 414/908 X |
| 3,154,907 | 11/1964 | Fisher | 242/571 X |
| 3,224,701 | 12/1965 | Wynne | 242/597.3 X |
| 3,346,208 | 10/1967 | Hoffman et al. | 242/597.3 |
| 3,850,382 | 11/1974 | Clingerman et al. | 242/597.3 X |
| 3,944,153 | 3/1976 | Linker | 242/597.3 |
| 4,084,762 | 4/1978 | Repp | 242/597.3 |
| 4,687,244 | 8/1987 | Cullen et al. | 414/911 X |
| 4,708,574 | 11/1987 | Conboy et al. | 414/908 X |
| 4,824,313 | 4/1989 | Miller | 414/444 X |
| 5,257,892 | 11/1993 | Branch | 414/490 |
| 5,330,121 | 7/1994 | Eley | 242/403.1 X |
| 5,487,638 | 1/1996 | Salsburg et al. | 414/910 X |
| 5,492,280 | 2/1996 | Corres et al. | 242/571.4 X |
| 5,524,415 | 6/1996 | Pachinger et al. | 414/444 X |
| 5,527,078 | 6/1996 | Messick | 414/911 X |
| 5,820,069 | 10/1998 | Segura Salvador et al. | 242/571.3 |

FOREIGN PATENT DOCUMENTS

| | | | |
|---|---|---|---|
| 142054 | 12/1948 | Australia | 242/571.4 |
| 6920667 U | 10/1969 | Germany . | |
| 3 340 977 | 5/1985 | Germany . | |

*Primary Examiner*—Robert P. Olszewski
*Assistant Examiner*—Gerald J. O'Connor
*Attorney, Agent, or Firm*—Alston & Bird LLP

[57] ABSTRACT

A transporter for lifting and transporting a paper reel having a central core. The transporter has an upright frame at the base of which are provided a pair of ground engaging wheels. A generally cylindrical mandrel, arranged to be received by the core of a reel to be lifted, projects from the front of the frame. The mandrel comprises a deflector member which is arranged to be deflected outwardly relative to the mandrel axis as the transporter frame is tilted backwards to cause the mandrel to take the weight of a paper reel. The deflector member is thus forced against the inside of the reel core, causing the mandrel to self-lock within the core.

18 Claims, 3 Drawing Sheets

HANDTRUCK WITH DEFLECTABLE MANDREL FOR LOCKING INSIDE THE CORE OF A REEL OR SPOOL TO BE LIFTED AND MOVED

FIELD OF THE INVENTION

The present invention relates to transporting apparatus and in particular, but not exclusively, to apparatus for transporting a reel having a substantially central, hollow core.

BACKGROUND OF THE INVENTION

In the printing industry it is common to use large reels or rolls of paper which comprise a continuous length of paper wrapped around a central core. These reels are mounted onto printing machinery by lifting the reel and locating the core onto a receiving rod.

The weight of these paper reels is often considerable and it can be extremely difficult for even several persons to manually lift them into place. In order to ease this task, specialized lifting apparatus have been designed for lifting large paper reels. Such lifting apparatus generally comprises a four-wheeled trolley on which is mounted hydraulic, electrical or mechanical lifting machinery. Typically, a mandrel projects from the lifting machinery and is arranged to be located within the core of the reel to be lifted. The mandrel is then raised vertically to position the reel at an appropriate height for receipt by the receiving rod of the printing apparatus. Generally, the mandrel extends only part-way through the core in order to leave enough room at the opposite end of the core so that the core can be transferred onto the receiving rod of the printing machinery.

Reel lifting apparatus comprising hydraulic and electrical lifting machinery tends to be relatively expensive. On the other hand, whilst mechanical, hand operated lifting machinery is cheaper, it still tends to be complex and can be difficult for persons of small stature to operate. Both types of machinery require a large amount of space in which to operate.

BRIEF SUMMARY OF THE INVENTION

It is an object of the present invention to overcome or at least mitigate the disadvantages of conventional reel lifting apparatus.

In particular, it is an object of the present invention to provide a reel lifting apparatus which can be operated by a single person, and in a relatively confined space.

According to the present invention there is provided a transporter for lifting and transporting a reel having a substantially central, hollow core, the transporter comprising:

a chassis;

a pair of ground engaging wheels coupled to the bottom of the chassis;

a pair of handlebars coupled to an upper region of the chassis and arranged to allow an operator to pivot the chassis relative to the ground; and an elongate mandrel projecting from the front of the chassis and arranged to be received by a core of a reel to be lifted and transported, the mandrel comprising deflecting means arranged to be deflected outwardly from the longitudinal axis of the mandrel by the weight of a reel when the mandrel supports a reel, so as to self-lock the mandrel within the core of the reel.

It will be appreciated that the mandrel may be released from the core of a reel by relieving the weight of the reel from the mandrel.

In one embodiment of the invention, the mandrel comprises a first portion integral with or rigidly secured to the chassis, a second portion hingeably coupled at an upper region thereof to said first portion, and reaction means engaging said first portion and extending at least part-way along said second portion to engage deflecting means coupled to the second portion, wherein, when the mandrel is not supporting a reel, the hingeable coupling is open and the reaction means maintains the deflecting means in a non-deflected position and, when the mandrel is supporting a reel, the hingeable coupling is arranged to substantially close due to the weight of the reel, moving the reaction means along said first portion in turn to move the deflector member to a deflected position to cause the mandrel to tightly engage the core of the supported reel.

Preferably, said chassis comprises a substantially upright frame with said two wheels being attached to the chassis for rotation about a common axis. However the frame may be provided with more than two wheels, e.g. three or four, at the bottom of the frame. The handlebars are preferably provided at the top of the upright frame.

Preferably, the mandrel projects from a substantially central region of the upright frame. Preferably, the upright frame is provided with a footplate projecting from the rear of the frame, at the bottom of the frame, to assist an operator to pivot the frame. Preferably also the frame comprises a stand for supporting the chassis in a near upright position.

Preferably, the second mandrel portion is additionally coupled to the first mandrel portion, or is coupled to the chassis, by a spring or other resilient means which acts to maintain the hingeable coupling open when the mandrel is not supporting a reel. More preferably, this spring or resilient means is connected to a flange which extends about the second mandrel portion.

In one embodiment of the present invention, the deflecting means comprises a third mandrel portion hingeably coupled at an upper end region thereof to an upper end region of the second mandrel portion, remote from said first mandrel portion. The reaction means may comprise a pin located within a channel extending through the second mandrel portion, the pin being substantially free to move within said channel and engaging at its ends respective end walls of the first and third mandrel portions.

Preferably, the second and third mandrel portions comprise cylinders of similar cross-section. The second and third portions are substantially axially aligned when the mandrel is in the non-supporting configuration, with the second hingeable coupling being substantially closed. When the mandrel begins to support a reel, the first hingeable coupling closes, and the pin is displaced through the second portion causing the second hingeable coupling to open, deflecting the third portion relative to the second portion. This causes the third portion to be forced against the upper inner surface of the reel core whilst the second portion is forced against the lower inner surface of the core.

In a second embodiment of the present invention, the deflecting member is arranged to lie substantially within the second member when the mandrel is in the non-supporting configuration. When the mandrel begins to support the reel, the reaction means is arranged to move within the second portion, and to radially deflect the deflecting means into contact with the inner surface with the reel core. More preferably, the reaction means comprises a cam surface which engages an inner surface of the deflecting means as the reaction means is moved longitudinally through the second portion, the deflecting means being forced outward relative to the second portion. The reaction means may comprise a spring or similar resilient means arranged to force the reaction means against the first mandrel portion, such that the hingeable coupling between the first and second portions remains open when the mandrel is in the non-supporting configuration.

According to another aspect of the present invention there is provided a transporter for lifting and transporting an item having a hollow core, the transporter comprising:

a chassis;

wheel means for engaging the ground coupled to the bottom of the chassis;

an operator grip coupled to an upper region of the chassis and arranged to allow an operator to pivot the chassis relative to the ground; and an elongate mandrel projecting from the front of the chassis and arranged to be received by a core of an item to be lifted and transported, the mandrel comprising deflecting means for deflection radially outwardly of the mandrel when the mandrel supports an item, so as to lock the mandrel within the core of the item.

BRIEF DESCRIPTION OF THE SEVERAL VIEWS OF DRAWINGS

For a better understanding of the present invention and in order to show how the same may be carried into effect reference will now be made, by way of example, to the accompanying drawings, in which.

DETAILED DESCRIPTION OF THE INVENTION

Figure 1:
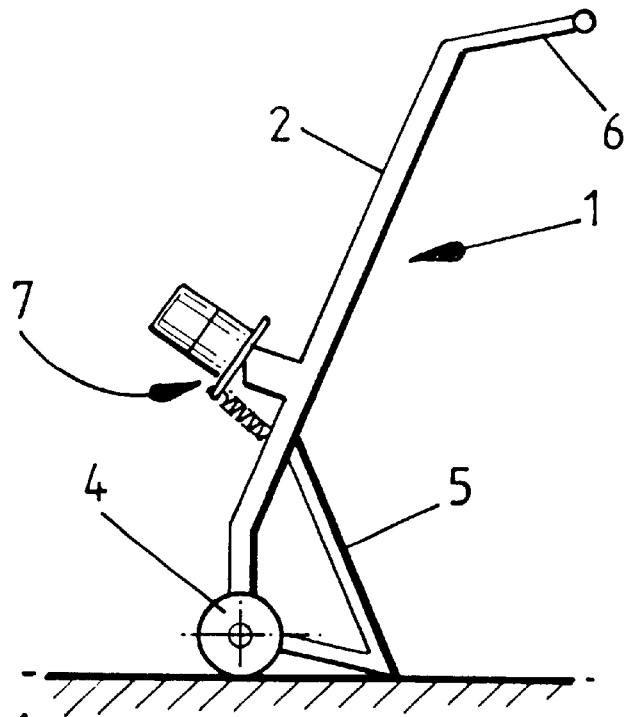
FIG. 1 shows a side view of a reel transporter embodying the present invention.
Figure 2:
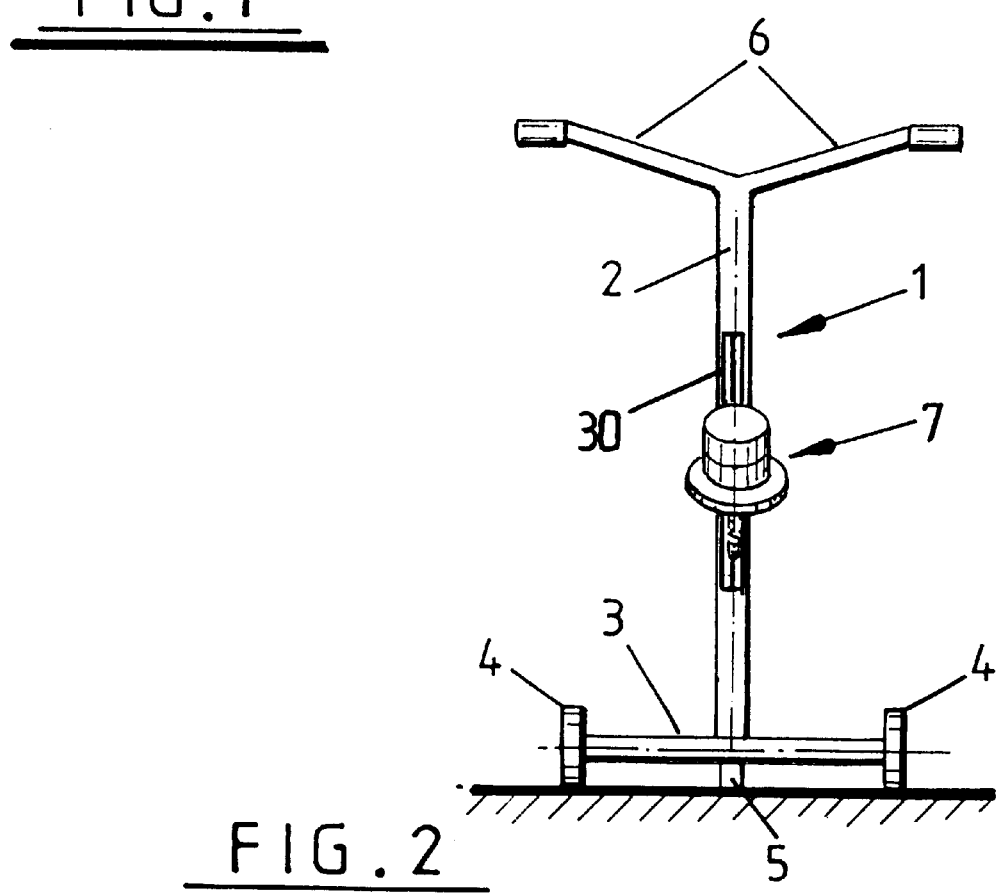
FIG. 2 shows a front view of the reel transporter of FIG. 1.

There is shown in FIGS. 1 and 2 a reel lifting apparatus and transporter designed to lift a reel of paper having a central, hollow core. The transporter comprises a chassis 1 having an upright frame member 2 and a horizontal cross member 3 coupled to the bottom end of the upright member 2. A pair of wheels 4 are coupled to respective ends of the cross member 3 for rotation relative thereto. A support member 5, having a 'V' shape, is connected at one end to an intermediate portion of the upright member 2 and at the other end to the center of the cross member 3. The support member allows the transporter to stand in its near-upright position. A pair of bull horn handle bars 6 are secured to the upper end of the upright member 2.

Figure 4:
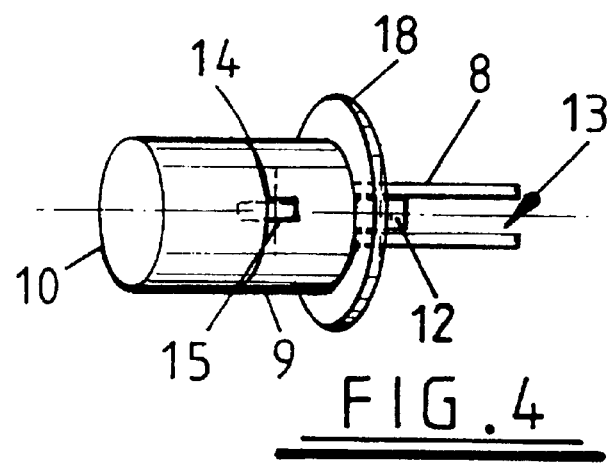
FIG. 4 shows a side view of the mandrel of FIG. 3.
Figure 5:
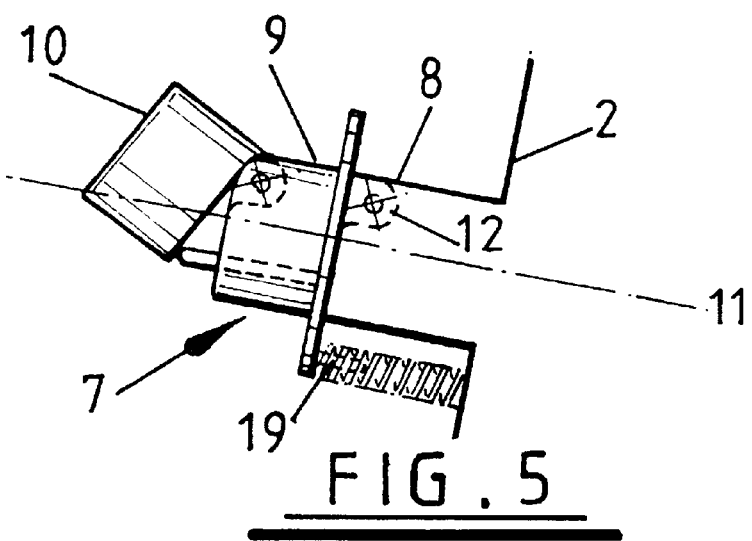
FIG. 5 shows the mandrel of FIG. 3 in a reel supporting configuration.

A mandrel 7 projects from the front of the upright member 2 and is arranged to be located in, and to engage, the core of a reel of paper to be lifted. The mandrel is shown in more detail in FIGS. 3 to 5.

The mandrel 7 comprises three portions 8, 9, 10 which are nominally aligned along a common longitudinal axis 11. The first portion 8 is formed integral with the upright member 2 and projects therefrom at a height above the ground which corresponds substantially to the height of a reel core above the ground when the reel is resting on the ground. The first portion comprises a pair of parallel, vertically aligned plates spaced apart by a small distance.

The second mandrel portion 9 is cylindrical in shape, having its axis nominally aligned with the axis 11, and is hingeably coupled at an upper edge region to the first mandrel portion 8 by way of a lug 12 which extends from the second portion to the slot 13 between the parallel plates of the first portion 8. The third mandrel portion 10 is also cylindrical in shape, having its axis nominally aligned with the axis 11. The third portion 10 is hingeably coupled to the second portion by way of a lug 14 which extends from the third portion to engage a slot 15 provided in the second portion.

A cylindrical channel 16 extends longitudinally through the second mandrel portion 9, the channel being offset from the cylinder axis, below the axis. A cylindrical pin 17 extends through the channel 16 provided in the second mandrel portion 9 and has a length greater than the length of that portion so that it projects from one or both of the ends of the channel 16.

A circular flange 18 is provided at the end of the second mandrel portion 9 adjacent the first mandrel portion 8. A curved pin 19 projects from the flange 18, towards the upright member 2 of the transporter frame, and receives one end of a spring 20. The spring is secured at its opposite end to the upright frame member 2.

Figure 6A:
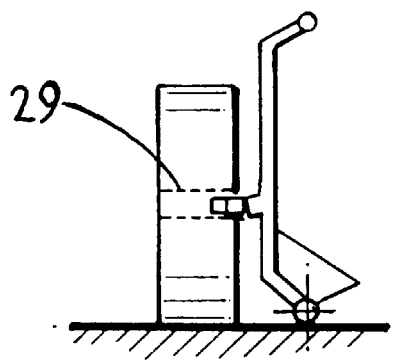
FIGS. 6a to 6c illustrate the operation of the reel transporter of FIG. 1.
Figure 6B:
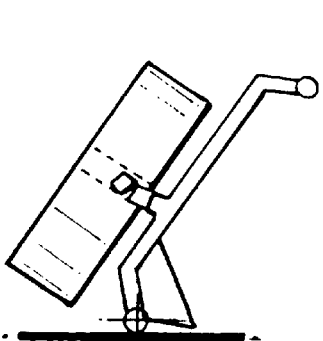

Providing that no downward force is applied on the second or third portions of the mandrel 7, the spring 20 holds the hingeable coupling, provided between the first and second mandrel portions, open so that the pin 17 projects from the second portion 9 to abut the first portion 8. As a result, the second and third portions tend to be aligned along a common longitudinal axis. This axis is arranged to extend substantially horizontally when the transporter is in the fully upright position (see FIG. 6).

Figure 6C:
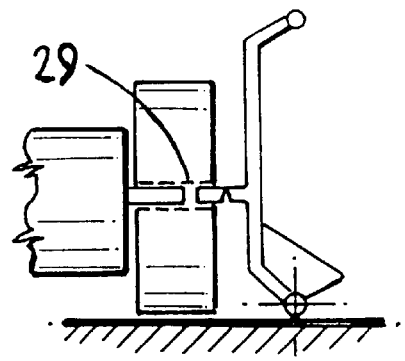

When it is desired to lift and transport a paper reel, the transporter is held in the fully upright position, as shown in FIG. 6c, and is wheeled forward so that the second and third portions 9, 10 of the mandrel 7 enter the paper reel core 29. The combined length of the second and third portions of the mandrel 7 is such that the mandrel 7 projects only part-way along the reel core 29. In order to lift the reel, the operator applies a forward force to the cross-bar 3 with his or her foot whilst pulling back on the handle bars 6, causing the transporter to tilt backwards about the axis of the wheels 4. The mandrel portions 9, 10 are raised upward within the paper reel core 29 by this action until the front upper edge of the third mandrel portion 10 contacts the core 29.

As the transporter is tilted still further, the third mandrel portion 10 is forced downward relative to the first mandrel portion 8. This action causes the pin 17 to be displaced through the channel 16 in the second mandrel portion and forced against the abutting wall of the third mandrel portion 10. The hingeable coupling between the first and second mandrel portion 8, 9 therefore tends to close whilst the hingeable coupling between the second and third portions 9, 10 tends to open. The third mandrel portion 10 is displaced relative to the axis 11. The greater the weight supported by the mandrel 7, the greater the displacement force applied to the third mandrel portion 10. This arrangement therefore provides for self-locking of the mandrel within a reel core.

Once the paper reel is raised off the ground, the operator can push the transporter and the reel forward and can align the core of the paper reel with a receiving rod provided on a printing machine. Once aligned, the transporter is pushed forward to locate the open end of the reel core on the rod. The operator can then allow the transporter to tilt forward into an upright position to unlock the mandrel from within the core. If necessary, the operator can then push the paper reel forward to secure the reel core on the receiving rod. The transporter is then withdrawn from the reel core.

Figure 3:
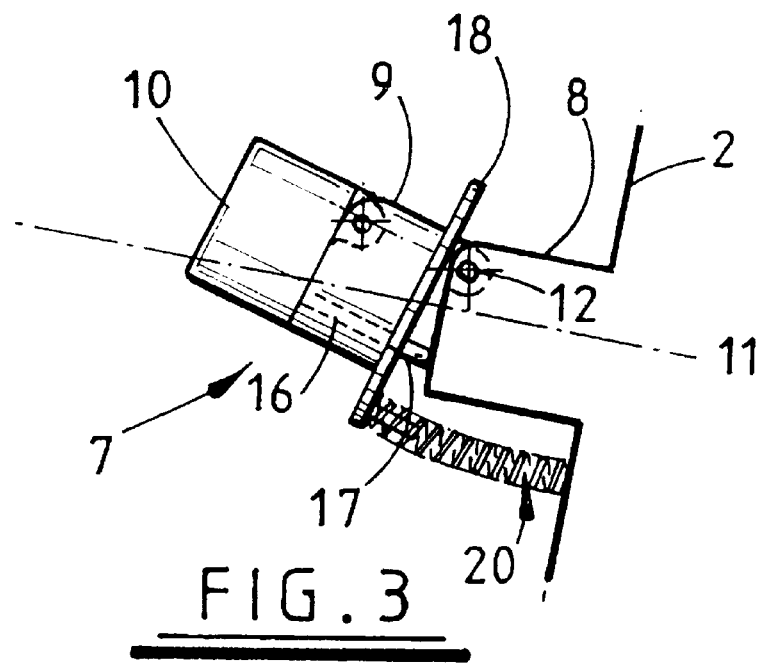
FIG. 3 shows in detail a mandrel of the transporter of a FIG. 1 where the mandrel is in a non reel supporting configuration.
Figure 7:
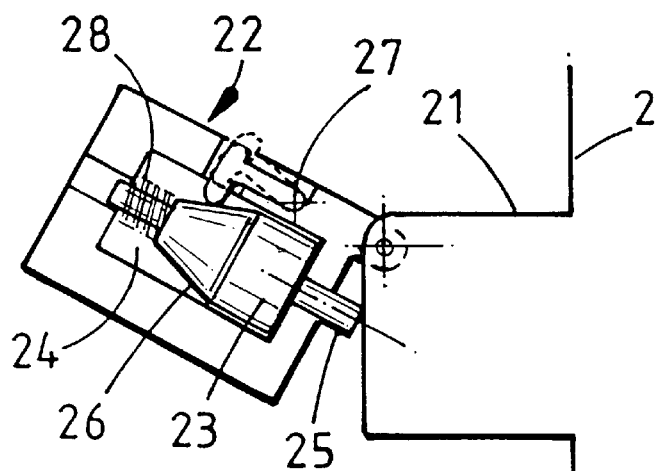
FIG. 7 shows an alternative mandrel for use with the transporter of FIG. 1.

There is shown in FIG. 7 an alternative mandrel which can be substituted for the mandrel of FIG. 3 in the transporter of FIG. 1. The mandrel of FIG. 7 comprises first and second mandrel portions 21, 22, the first portion 21 being coupled to, or integral with, the upright member of the transporter in the same manner as the first portion of the mandrel of FIG. 3. Similarly, the second portion 22 is hingeably coupled to the first portion 21. An inner cylindrical member 23 is located within a channel 24 provided within the second portion 22 and is secured to a central pin 25 which projects from the second portion to contact the opposed end wall of the first mandrel portion 21. A spring 28 is disposed around one end of pin 25, between the end of the inner member 23 remote from the first mandrel portion 21, and the inner surface of the second mandrel portion.

The end of the inner member 23 is trusto-conical in shape so as to provide a cam portion 26 which contacts an inwardly projecting region of a deflecting pin 27. The deflecting pin 27 is substantially 'T' shaped and is pivotally coupled to an outer region of the second mandrel portion 22.

As described above, in order to lift a paper reel, the mandrel is aligned and inserted into a core of a reel to be lifted. As the transporter is tilted backwards, the second mandrel portion 22 is forced into contact with the inner surface of the reel core. This causes the pin 25 to be forced against the abutting end wall of the first mandrel portion 21 which in turn causes the inner member 23 to compress the spring 28 and to drive the cam portion of the inner member across the deflecting member 27. The deflecting member 27 is driven outward into contact with the upper inner surface of the reel core. The reel can then be lifted and transported to engage the open end of the core with a receiving rod on a print machine. As the transporter is returned to the upright position, the force on the pin 25 is removed and the spring 28 forces the inner member 23 to return to its nominal position, returning the deflecting member 27 to lie wholly within the second portion 22. The transporter can then be moved to withdraw the mandrel from the reel core.

It will be appreciated that various modifications may be made to the above described embodiments without departing from the scope of the present invention. In particular, the mandrel may be attached to the transporter by way of a sliding coupling 30 to enable the height of the mandrel above the ground to be varied. This enables various sizes of reels to be lifted by the transporter.

What is claimed is:

1. A transporter for lifting and transporting a reel having a substantially central, hollow core, the transporter comprising:

a chassis;

a pair of ground engaging wheels coupled to the bottom of the chassis;

a pair of handlebars coupled to an upper region of the chassis and arranged to allow an operator to pivot the chassis relative to the ground; and an elongate mandrel projecting from the front of the chassis and arranged to be received by a core of a reel to be lifted and transported, the mandrel comprising a deflector member arranged to be deflected outwardly from the longitudinal axis of the mandrel by the weight of a reel when the mandrel supports a reel, so as to self-lock the mandrel within the core of the reel.

2. A transporter according to claim 1, wherein the mandrel comprises a first portion fixed relative to the chassis, a second portion hingeably coupled to said first portion, and reaction means mounted on the second portion for engaging said first portion and the deflector member which is coupled to the second portion, wherein when the mandrel is not supporting a reel, the hingeable coupling is in a first configuration and the reaction means maintains the deflecting member in a retracted position and, when the mandrel is supporting a reel, the hingeable coupling is reconfigured by the weight of the reel, moving the reaction means to extend the deflector member to cause the mandrel to engage the core of the supported reel.

3. A transporter according to claim 2, wherein the second mandrel portion is additionally coupled to the first mandrel portion, or is coupled to the chassis, by a resilient means for maintaining the hingeable coupling in the first configuration when the mandrel is not supporting a reel.

4. A transporter according to claim 3, wherein the deflector member comprises a third mandrel portion hingeably coupled to the second mandrel portion, remote from said first mandrel position.

5. A transporter according to claim 4, wherein the reaction means comprises a pin located within a channel extending through the second mandrel portion, the pin being substantially free to move within said channel and engaging at its ends the first and third mandrel portions.

6. A transporter according to claim 5, wherein the second and third mandrel portions comprise cylinders of similar cross-section which are substantially axially aligned when the mandrel is in the non-supporting configuration.

7. A transporter according to claim 4, wherein the second and third mandrel portions comprise cylinders of similar cross-section which are substantially axially aligned when the mandrel is in the non-supporting configuration.

8. A transporter according to claim 2, wherein the deflector member comprises a third mandrel portion hingeably coupled to the second mandrel portion, remote from said first mandrel portion.

9. A transporter according to claim 8, wherein the reaction means comprises a pin located within a channel extending through the second mandrel portion, the pin being substantially free to move within said channel and engaging at its ends the first and third mandrel portions.

10. A transporter according to claim 9, wherein the second and third mandrel portions comprise cylinders of similar cross-section which are substantially axially aligned when the mandrel is in the non-supporting configuration.

11. A transporter according to claim 8, wherein the second and third mandrel portions comprise cylinders of similar cross-section which are substantially axially aligned when the mandrel is in the non-supporting configuration.

12. A transporter according to claim 2, wherein the deflector member is arranged to lie substantially within the second mandrel portion when the mandrel is in the non-supporting configuration and to be deflected outwardly and project from the second portion when the mandrel is in a reel supporting configuration.

13. A transporter according to claim 12, wherein the reaction means comprises a cam member which engages an inner surface of the deflector member as the reaction means is moved longitudinally relative to the second portion, to force the deflector member outward relative to the second portion.

14. A transporter according to claim 13, wherein the reaction means includes resilient means for forcing the reaction means against the first mandrel portion, such that the hingeable coupling between the first and second portions remains in the first configuration when the mandrel is in the non-supporting configuration.

15. A transporter according to claim 1, wherein the chassis comprises a substantially upright frame with said two wheels being attached to the chassis for rotation about a common axis.

16. A transporter according to claim 1 wherein the chassis comprises a substantially upright frame and the mandrel projects from a substantially central region of the upright frame, and the frame is provided with a footplate projecting from the rear of the frame, at the bottom of the frame, to assist an operator to pivot the frame.

17. A transporter according to claim 1 and comprising means for varying the spacing of the mandrel relative to said wheels to enable various sizes of reels to be lifted.

18. A transporter for lifting and transporting an item having a hollow core portion, the transporter comprising:

a chassis;

wheel means for engaging the ground coupled to the bottom of the chassis;

an operator grip coupled to an upper region of the chassis and arranged to allow an operator to pivot the chassis relative to the ground; and an elongate mandrel projecting from the front of the chassis and arranged to be received by a core portion of an item to be lifted and transported, the mandrel comprising deflecting means for deflection radially outwardly of the mandrel by the weight of an item when the mandrel supports an item, so as to lock the mandrel within the core portion of the item.

* * * * *